(12) United States Patent
Kanda et al.

(10) Patent No.: US 7,218,994 B2
(45) Date of Patent: May 15, 2007

(54) ROBOT

(75) Inventors: Shinji Kanda, Kawasaki (JP); Yuichi Murase, Kawasaki (JP); Sumihisa Iwashita, Kawasaki (JP); Katsutoshi Shimizu, Kawasaki (JP); Naoyuki Sawasaki, Kawasaki (JP); Keiju Okabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 11/083,900

(22) Filed: Mar. 21, 2005

(65) Prior Publication Data

US 2005/0165508 A1  Jul. 28, 2005

Related U.S. Application Data

(63) Continuation of application No. PCT/JP02/10218, filed on Oct. 1, 2002.

(51) Int. Cl.
*G06F 19/00* (2006.01)

(52) U.S. Cl. ............... 700/245; 700/258; 700/259; 318/568.12; 342/47; 342/53; 701/225

(58) Field of Classification Search .......... 700/245, 700/258, 259; 318/568.12; 342/47, 53; 701/225
See application file for complete search history.

(56) References Cited

U.S. PATENT DOCUMENTS

| | | | |
|---|---|---|---|
| 5,815,880 A | 10/1998 | Nakanishi | |
| 5,942,869 A | 8/1999 | Katou et al. | |
| 6,247,538 B1 | 6/2001 | Takeda et al. | |
| 6,353,814 B1 * | 3/2002 | Weng | 706/12 |
| 6,438,456 B1 * | 8/2002 | Feddema et al. | 700/245 |
| 6,459,955 B1 * | 10/2002 | Bartsch et al. | 700/245 |
| 6,611,738 B2 * | 8/2003 | Ruffner | 701/23 |
| 6,748,297 B2 * | 6/2004 | Song et al. | 700/259 |
| 6,836,701 B2 * | 12/2004 | McKee | 700/245 |
| 7,031,805 B2 * | 4/2006 | Lee et al. | 700/245 |
| 7,047,105 B2 * | 5/2006 | Kakutani et al. | 700/245 |
| 7,066,291 B2 * | 6/2006 | Martins et al. | 180/167 |
| 7,068,815 B2 * | 6/2006 | Chang et al. | 382/106 |

(Continued)

FOREIGN PATENT DOCUMENTS

EP  WO 01/84260  11/2001

(Continued)

OTHER PUBLICATIONS

Song et al., Reactive navigation in dynamic environment using a multisensor predictor, 1999, IEEE, p. 870-880.*
Katevas et al., The autonomous mobile robot SENARIO: A sensor-aided intelligent navigation system for powered wheelcharis, 1997, IEEE, p. 60-70.*

(Continued)

*Primary Examiner*—Thomas Black
*Assistant Examiner*—McDieunel Marc
(74) *Attorney, Agent, or Firm*—Staas & Halsey LLP

(57) ABSTRACT

A robot for freely moving about in an environment where there is an obstacle. The robot includes a communication section transmitting by wireless an image taken by a camera to a base station, and via the base station to a communication terminal making a radio communication with the base station, and receiving by wireless movement target position information specified on the image by an operation of the communication terminal via the base station, and a motion control section that moves the robot up to a movement target position specified by the movement target position information acquired in the communication section.

10 Claims, 10 Drawing Sheets

U.S. PATENT DOCUMENTS

| | | | |
|---|---|---|---|
| 7,158,859 B2 * | 1/2007 | Wang et al. | 700/245 |
| 2002/0049521 A1 | 4/2002 | Ruffner | |
| 2004/0252862 A1 * | 12/2004 | Camus et al. | 382/104 |

FOREIGN PATENT DOCUMENTS

| | | |
|---|---|---|
| FR | 2697098 | 4/1994 |
| JP | 9-146633 | 6/1997 |
| JP | 10-228315 | 8/1998 |
| JP | 11-149315 | 6/1999 |
| JP | 11-320467 | 11/1999 |
| JP | 2000-214927 | 8/2000 |
| JP | 2000-342498 | 12/2000 |
| JP | 2001-60111 | 3/2001 |
| JP | 2001-125645 | 5/2001 |

OTHER PUBLICATIONS

Luo et al., Multiagent and event driven based dynamic collision avoidance for an autonomous mobile robot, 1998, IEEE, p. 558-663.*

Miyazaki et al., Obstacle avoidance behavior of autonomous mobile robot, 2000, IEEE, p. 1925-1930.*

Siegwart et al., Interacting Mobile Robots on the Web, 1999, Internet, pp. 1-7.*

Supplemental Partial European Search Report dated Nov. 10, 2005 issued in corresponding European Patent Application No. EP02777803.

Japanese Office Action dated Sep. 5, 2006, citing the above and two other references already of record.

Notice of Final Rejection dated Dec. 14, 2006 issued in corresponding Japanese Patent Application No. 2004-541181.

* cited by examiner (A) Portable telephone (B) Image photographed by robot

ROBOT

This application is a continuing application, filed under 35 U.S.C. §111(a), of International Application PCT/JP02/10218, filed Oct. 1, 2002.

BACKGROUND OF THE INVENTION

1. Technical Field

The present invention relates to a robot that can freely move, and more particularly to a robot having the structure suitable for a small robot for home use.

2. Background Art

In recent years, various apparatuses are equipped with a remote controller for controlling the operation of apparatus. In the present state of affairs, each house has more than one remote controller. Also, various robots have been recently developed, and entered each home. When a robot is introduced into the home, it is unfavorable that a new remote controller is prepared for operation of the robot because the price is correspondingly increased. Since the portable telephones have broadly spread in recent years, a portable telephone may be utilized as the remote controller, instead of preparing the new remote controller, by providing the robot with the same communication functions as those of the portable telephone. In this case, in consideration of the service charge, it is beneficial to employ a packet communication function rather than the telephone function of the portable telephone. Also, the robot may be mounted with a camera to transmit the image from the robot via the base station to the portable telephone.

However, when the portable telephone is employed as the remote controller, the direct communication between the portable telephone and the robot is not enabled, in which a command inputted by a key operation of the portable telephone is once transmitted to the base station, and then transmitted from the base station to the robot.

In this case, a considerable time is required from operating the portable telephone till the arrival of the command to the robot, giving rise to various inconveniences.

For example, when an image is delivered from the robot, an obstacle may be actually imminent to the robot's eyes, even though the obstacle is farther away from the robot in the advancement direction on the image, in which there is a possible situation that a change-direction command for avoidance is issued too late.

In this case, the robot has a sensor for sensing the contact with the obstacle, in which if the robot makes contact with the obstacle, the robot is automatically reoriented. In this constitution, if the robot has a round shape, the robot can turn on the spot upon contact with the obstacle, while if the robot has an angular shape, the robot tries to turn after contact with the obstacle, but can not change direction successfully, causing a risk that the robot becomes immovable on the spot.

Also, when the robot is tried to move to any position, the amount of movement may be numerically inputted, or the robot may be moved while the switch is being pressed (e.g., refer to Japanese Patent Laid-Open No. 11-320467). Such a command method is effective when the robot can be directly watched with the eyes and the communication with the controller is made fast. For example, when one wants to move the robot within the house from the outside by issuing a movement command, employing a packet communication function of the portable telephone, it is difficult to enable the robot to perform a smooth movement.

SUMMARY OF THE INVENTION

It is an object of the present invention to provide a robot having the structure suitable for freely moving about in the environment where there is an obstacle within the house, for example.

In order to accomplish the above object, a first robot of the invention is a robot capable of freely advancing, retreating and rotating, including a sensor that senses the existence of an obstacle hampering the advancement of the robot, and a motion control section that performs an obstacle avoidance movement in which the robot retreats to a position where the robot is freely rotatable by avoiding the obstacle when the sensor senses the existence of the obstacle during the advancement of the robot.

Since the first robot of the invention retreats to a position where the robot is freely rotatable by avoiding the obstacle when the sensor senses the existence of the obstacle, the robot, even having an angular shape, can retreat, rotate, and advances in a different direction away from the obstacle, avoiding a situation where the robot becomes immovable on the spot.

Herein, in the first robot of the invention, the sensor may be a contact sensor sensing that the robot contacts the obstacle in the front, or the sensor may be a distance sensor measuring a distance up to a measuring point that is forward obliquely below.

Also, in order to accomplish the above object, a second robot of the invention is a robot capable of freely advancing, retreating and rotating, including: a sensor that senses whether or not a front obstacle is an obstacle having a predetermined height or less that the robot can get over, or an obstacle having more than the predetermined height that the robot can not get over; and a motion control section that controls the robot to continuously advance to get over the obstacle if the height of the obstacle sensed by the sensor is the predetermined height or less during the advancement, or to perform an obstacle avoidance movement including at least one of the retreat and rotation, if the height of the obstacle sensed by the sensor is more than the predetermined height.

For example, there are many scenes where the robot can not move to the target spot if always changing direction to avoid the obstacle such as a difference in level. Thus, when the obstacle is the difference in level, it is ascertained whether or not the robot can get over the obstacle, and if the robot can get over the obstacle, the robot needs to get over the obstacle. However, if the robot attempts to get over the obstacle recklessly, there is a risk that the robot becomes immovable on the spot.

The second robot of the invention includes a sensor that senses whether or not a front obstacle is an obstacle having a predetermined height or less that the robot can get over, or an obstacle having more than the predetermined height that the robot can not get over, in which if the obstacle has the predetermined height or less, the robot is allowed to get over the obstacle, avoiding a situation where the robot becomes immovable and assuring the free movement.

Herein, in the second robot, the sensor is preferably composed of a first sensor sensing the contact with the obstacle having the predetermined height or less during the advancement, and a second sensor sensing the contact with the obstacle having more than the predetermined height, in which the obstacle is determined to have the predetermined height or less if the obstacle is sensed by only the first contact sensor of the first and second contact sensors, or the obstacle is determined to have more than the predetermined height if the obstacle is sensed by the second sensor.

In this way, it is possible to securely determine whether or not the robot can get over the obstacle by including both the first contact sensor and the second contact sensor.

Also, the robot preferably further includes a distance sensor measuring a distance up to a measuring point that is forward obliquely below, in addition to the first and second contact sensors, in which the motion control section decreases an advancing speed when the distance sensor senses a predetermined distance or less during the advancement.

Thereby, the robot can perform slowly and securely the operation of getting over the obstacle without strongly colliding with the obstacle.

Herein, both the first robot and the second robot preferably further includes a communication section that receives control data from a base station by wireless, the control data being transmitted from a communication terminal making the radio communication with the base station to the base station, in which the motion control section is operated based on the control data received by the communication section, and performs the obstacle avoidance movement without waiting for the control data to be received by the communication section.

By performing the obstacle avoidance movement without waiting for the control data to be received, the robot is adapted to the communication terminal that is not expected to make the fast transfer of the control data such as when making the communication via the base station.

Also, in order to accomplish the above object, a third robot of the invention is a robot capable of freely moving, including: a camera; a movement target position information acquisition section that acquires movement target position information specified on an image photographed by the camera; and a motion control section that moves the robot up to a movement target position specified by the movement target position information acquired by the movement target position information acquisition section.

The third robot of the invention acquires the movement target position information specified on an image photographed by the camera, and moves up to a movement target position specified by the movement target position information, whereby under this control, the user is only necessary to specify the movement target position on the image without knowing the distance up to the movement target position, to allow the robot to move up to the movement target position smoothly.

Herein, the third robot may further include a communication section that transmits an image taken by the camera to a base station by wireless, and via the base station to a communication terminal making the radio communication with the base station, and receives by wireless the movement target position information specified on the image by an operation of the communication terminal via the base station, in which the movement target position acquisition section consists of the communication section.

Also, in the third robot, it is preferable that the camera is composed of a pair of left and right cameras installed a predetermined distance away from each other to have a parallax, the robot further includes a distance measurement section measuring a distance up to the movement target position specified by the movement target position information acquired by the movement target position information acquisition section, employing the parallax of the pair of left and right cameras, and the motion control section recognizes a movement distance based on the distance measured by the distance measurement section when the robot moves up to the movement target position.

In addition, the third robot preferably further includes: a visual line movement section that moves the visual line of the camera to the left or right; and a direction calculation section that calculates a direction to the movement target position in consideration of an orientation of the camera when taking the image on which the movement target information acquired by the movement target position acquisition section is based, in which the motion control section recognizes a movement direction based on the direction calculated by the direction calculation section when the robot moves up to the movement target position.

Moreover, in a preferred form, the third robot further includes an image storage section that stores rewritably a reference image ahead in the advancement direction, which is photographed by the camera, in which the motion control section controls the robot to advance by repeating the pattern matching between the current image photographed by the camera and the reference image stored in the image storage section to modify the advancement direction.

Moreover, in the third robot, it is preferable that when the pair of left and right cameras and the distance measurement section are provided, the distance measurement section measures a distance up to the movement target position and a distance up to the obstacle, employing the parallax between the pair of left and right cameras, and the motion control section performs an obstacle avoidance movement including the operation of changing the movement direction by acquiring information about the distance up to the obstacle measured by the distance measurement section.

Thus, the present invention provides the robot capable of moving about freely in the environment where there is any obstacle within the house, for example.

DESCRIPTION OF THE EMBODIMENTS

The preferred embodiments of the present invention will be described below.

Figure 1:
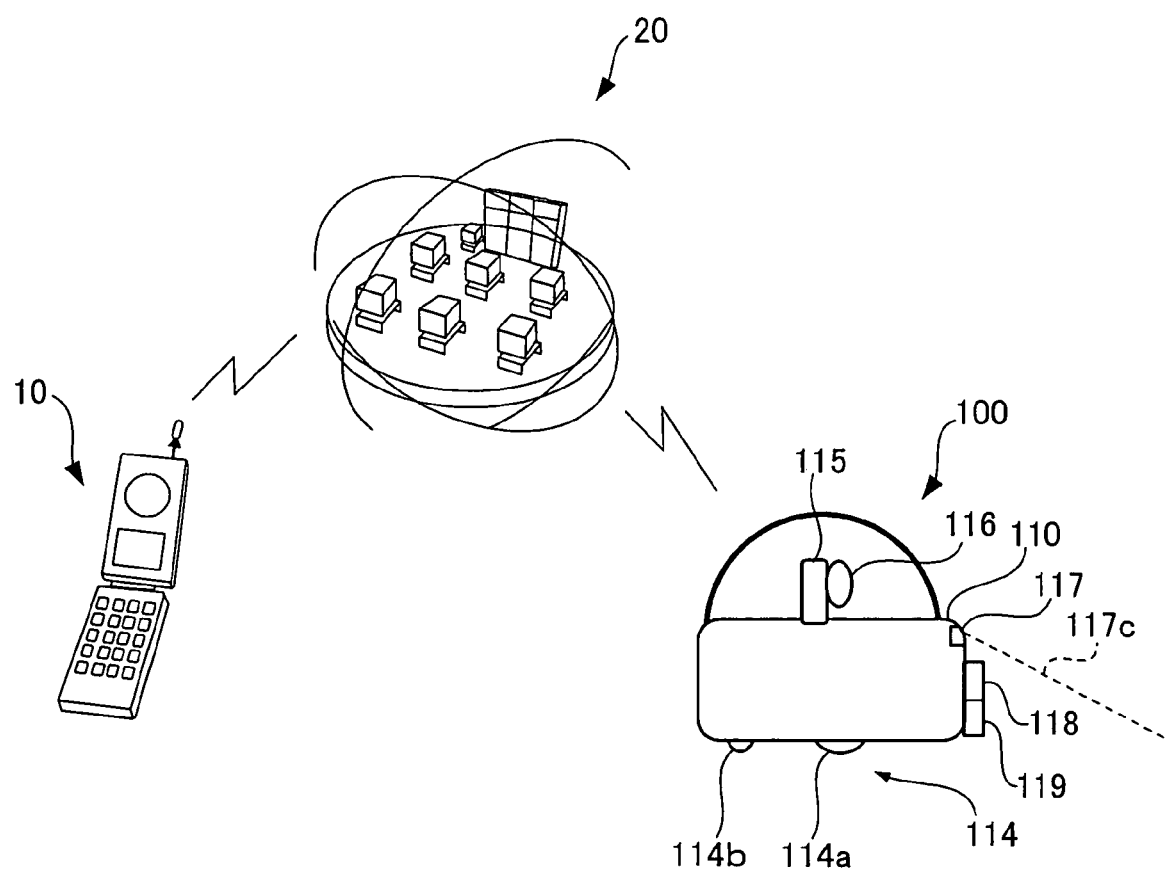
FIG. 1 is a view showing a robot according to one embodiment of the present invention, and a control system controlling the robot employing a packet communication function of the portable telephone.

FIG. 1 is a view showing a robot according to one embodiment of the present invention, and a control system controlling the robot, employing a packet communication function of the portable telephone.

Each of the portable telephone 10 and the robot 100 has a function of making the packet communication with a base station 20. The robot 100 has a function of transmitting through the packet communication an image photographed by a camera 116 mounted on the robot via the base station 20 to the portable telephone 10. Also, the portable telephone 10 has a function of displaying the cursor indicating the movement target position of the robot 100 on the transmitted image by a key operation, and a function of transmitting the coordinate information of the cursor on the image via the base station 20 to the robot 100.

Figure 2:
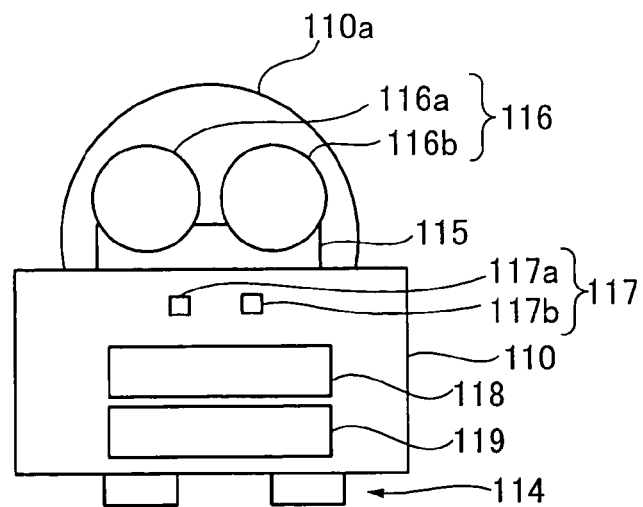
FIG. 2 is a front view of the robot.

Referring to FIGS. 1 and 2, the structure of this robot 100 will be described below.

FIG. 2 is a front view of the robot 100.

This robot 100 has a driving section 114 under a robot housing 110. This driving section 114 is equipped with a frontwheel 114a and a rearwheel 114b, as shown in FIG. 1. Each of the front wheel 114a and the rear wheel 114b includes a pair of wheels, left and right, as shown in FIG. 2. This robot 100 can advance, retreat or rotate by driving the front wheel 114a and the rear wheel 114b. Herein, the front wheel 114a employs a crawler type wheel (see FIG. 8), whereby the robot can advance by getting over a difference in level, employing the crawler type front wheel. The operation of getting over the difference in level employing the crawler type wheel will be described later with reference to FIG. 8.

Also, an upper bumper 118 and a lower bumper 119 are provided on a front face of the robot housing 110 of this robot 100. When this robot 100 advances to collide with an obstacle, an upper bumper switch 118a (see FIG. 4) provided on the upper bumper 118 is turned on, if the upper bumper 118 bumps into it, or a lower bumper switch 119a (see FIG. 4) provided on the lower bumper 119 is turned on, if the lower bumper 119 bumps into it. Thereby, this robot 100 recognizes whether the upper bumper 118 or the lower bumper 119 bumps into the obstacle. The reason why the upper bumper 118 and the lower bumper 119 are provided separately will be described below.

Also, a distance sensor 117 is provided on top of a two-stage bumper composed of the upper bumper 118 and the lower bumper 119.

This distance sensor 117 is composed of a light projecting section 117a and a light receiving section 117b, as shown in FIG. 2. The light projecting section 117a projects a light beam 117c forward obliquely downward, as shown in FIG. 1. The light receiving section 117b receives a light reflected from a measuring point (e.g., floor face) to which the light beam is applied to measure the distance up to the measuring point.

Also, an upper portion of the robot housing 110 is a dome-type transparent case 110a, and a twin-lens camera having a right camera 116a and a left camera 116b installed a predetermined distance apart from each other to the left and right to have a parallax is disposed inside the transparent case 110a, as shown in FIG. 2.

This twin-lens camera 116 is supported on a swivel base 115 revolving around a longitudinal axis of rotation to change the direction of the line of sight of the twin-lens camera 116.

Of the right camera 116a and the left camera 116b making up this twin-lens camera 116, an image photographed by the right camera 116a is transmitted through the packet communication via the base station 20 to the portable telephone 10 in this embodiment, as shown in FIG. 1.

Figure 3:
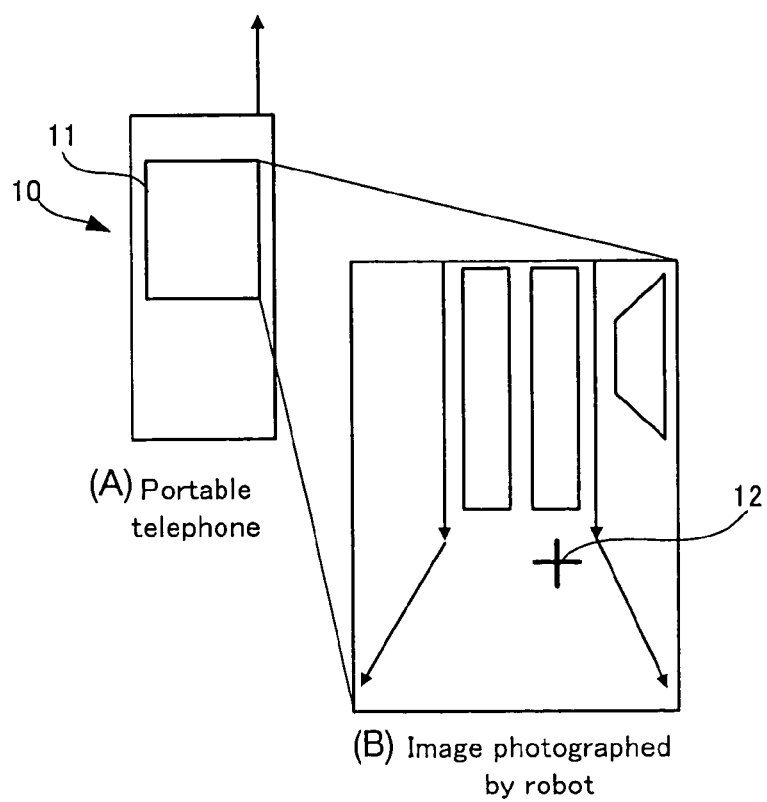
FIG. 3 is a view showing the portable telephone and one example of an image on a display screen of the portable telephone.

FIG. 3 is a view showing the portable telephone in part (A) and one example of an image in part (B) on the display screen of the portable telephone.

As described above, the image photographed by the right camera 116a of the robot 100 is transmitted from the robot 100 via the base station 20 to the portable telephone 10, and the portable telephone 10 receiving the image displays the received image on a display screen 11. By operating the keys of the portable telephone 10, the user of the portable telephone 10 has a cursor 12 superposed on the displayed image, moves the cursor 12 to the movement target position of the robot 100, and makes a transmission operation, as shown in part (B) of FIG. 3. Then, the coordinate information of the cursor 12 on the image is transmitted via the base station 20 to the robot 100. The robot 100 acquires the direction and distance to the movement target position based on the received coordinate information, and moves to the movement target position.

Figure 4:
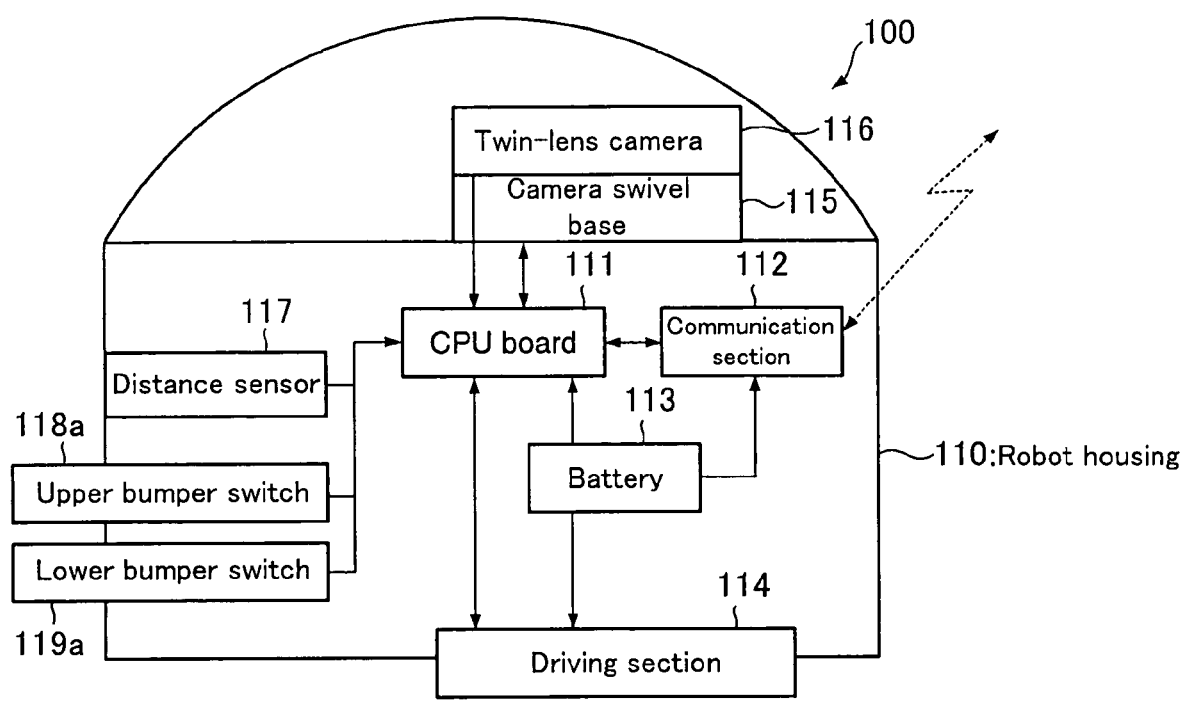
FIG. 4 is a block diagram showing the configuration of the robot according to this embodiment.

FIG. 4 is a block diagram showing the configuration of the robot according to this embodiment.

In FIG. 4, a CPU board 111, a communication section 112, a battery 113, an upper bumper switch 118a and a lower bumper switch 119a are shown, though these components are not shown in FIGS. 1 and 2.

The CPU board 111 mounts a CPU, an I/O interface and a memory storing programs executed in the CPU and takes charge of the overall control of the robot 100.

Also, the communication section 112 serves to receive via the CPU board 111 an image photographed by the right camera 116a (see FIG. 2) of the twin-lens camera 116 and transmit the image via the base station to the portable telephone, as well as receive the coordinate information of the cursor on the image displayed in the portable telephone from the portable telephone via the base station and passing it to the CPU board 111.

Also, this robot 100 can operate with a power from the battery 113. In FIG. 4, the arrow is only drawn from the battery 113 to the CPU board 111, the communication section 112 and the driving section 114, to simply avoid complex illustration, although the battery 113 supplies a required power to the other components as well.

Also, the upper bumper switch 118a is turned on, when the upper bumper 118 bumps into the obstacle, as shown in FIGS. 1 and 2. The CPU board 111 is notified that the upper bumper 118 bumps into the obstacle. Similarly, the lower bumper switch 119a is turned on, when the lower bumper 119 bumps into the obstacle, as shown in FIGS. 1 and 2. The CPU board 111 is notified that the lower bumper 119 bumps into the obstacle.

Moreover, the CPU board 111 acquires the distance information up to the measuring point located forward obliquely downward, measured by the distance sensor 117, and the image photographed by the right camera 116a and the left camera 116b (see FIG. 2) of the twin-lens camera 116. Also, this CPU board 111 controls the driving section 114 and the camera swivel base 115, and enables the communication section 112 to transmit the image.

An operation sequence of the robot under the control of the CPU board 111 will be described in the following.

Figure 5:
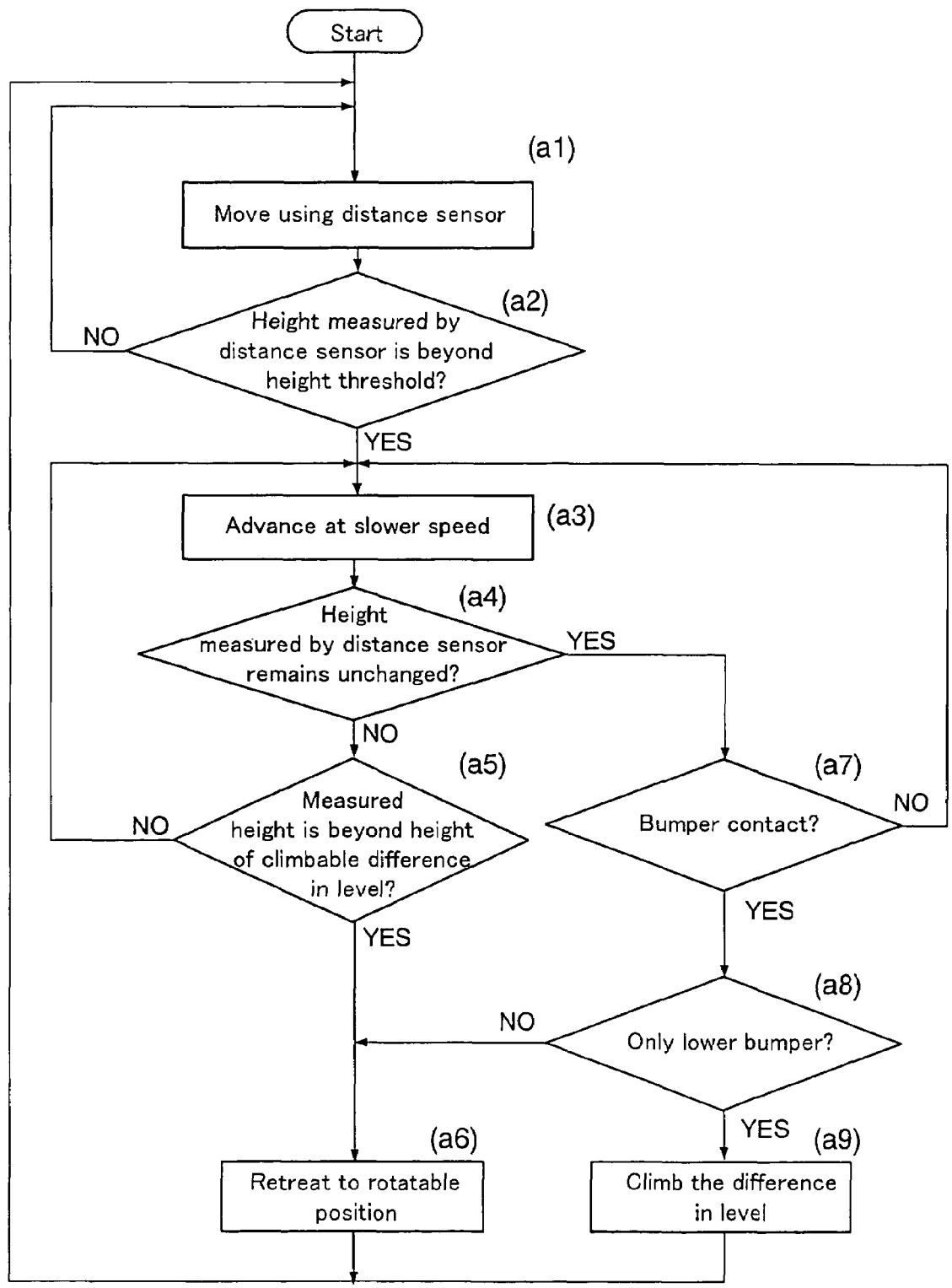
FIG. 5 is a flowchart showing one example of an operation sequence of the robot.

FIG. 5 is a flowchart showing one example of the operation sequence of the robot.

Herein, the robot is moving toward the movement target position obtained from the coordinate information of the cursor while measuring the distance up to the movement target position using the distance sensor 117 as shown in FIGS. 2 and 4 (step a1).

Herein, the CPU board 111 (see FIG. 4) monitors whether or not the distance measured by the distance sensor 117 is less than a predetermined threshold of distance (step a2). If there is any obstacle such as a difference in level or wall in the front, a projection beam from the distance sensor is reflected not at the flat floor face but at an upper face of the difference in level or wall face above the floor face, so that the distance sensor measures a shorter distance than when light is reflected at the flat floor face. If the distance sensor measures the distance less than the predetermined threshold (i.e., higher position than a predetermined threshold of height), the CPU board 111 controls the driving section 114 to change the advancing speed to a slower speed, whereby the robot continues to advance at the slower speed (step a3).

While the robot is advancing at the slower speed, the distance measurement by the distance sensor is continued. Then, it is determined if the distance measured by the distance sensor remains changed while the robot is moving at the slower speed (step a4). No distance change during the advancement means that the obstacle in the front is a "difference in level" with almost flat upper face, and any distance change (gradually shorter distance) means that the obstacle in the front is a wall. Though once the predetermined short distance is sensed at step a2, the robot starts to move at slower speed, when the original distance is thereafter restored (the height is lowered to the original height), it is meant that an obstacle having a short width lies in the advancement direction, in which the obstacle is treated as the difference in level rather than the wall.

If the distance measured by the distance sensor is not changed (or the original distance is restored) after the robot starts to advance at the slower speed at step a4, the robot continues to advance at the slower speed until the bumper bumps into the obstacle (step a7). If the bumper bumps into the obstacle, it is determined whether or not only the lower bumper bumps into the obstacle (step s8). If only the lower bumper bumps into the obstacle, the robot can get over the difference in level having that height, whereby the robot climbs the difference in level (step a9), and further continues to advance.

On the other hand, if it is determined that the upper bumper bumps into the obstacle at step a8, the robot can not get over the difference in level having that height, whereby the robot retreats to the position where it can rotate (step a6).

At step a4, if the distance measured by the distance sensor is gradually changed to be shorter while the robot is advancing at the slower speed, and a short distance corresponding to the height beyond which the robot can not climb the difference in level is measured by the distance sensor (step a5), the robot stops on the spot and retreats to the position where it can rotate (step a6).

After the robot retreats to the position where it can rotate, the robot turns to the direction where there is no obstacle which will be later described with reference to FIG. 10, and advances further (step a1).

Figure 6:
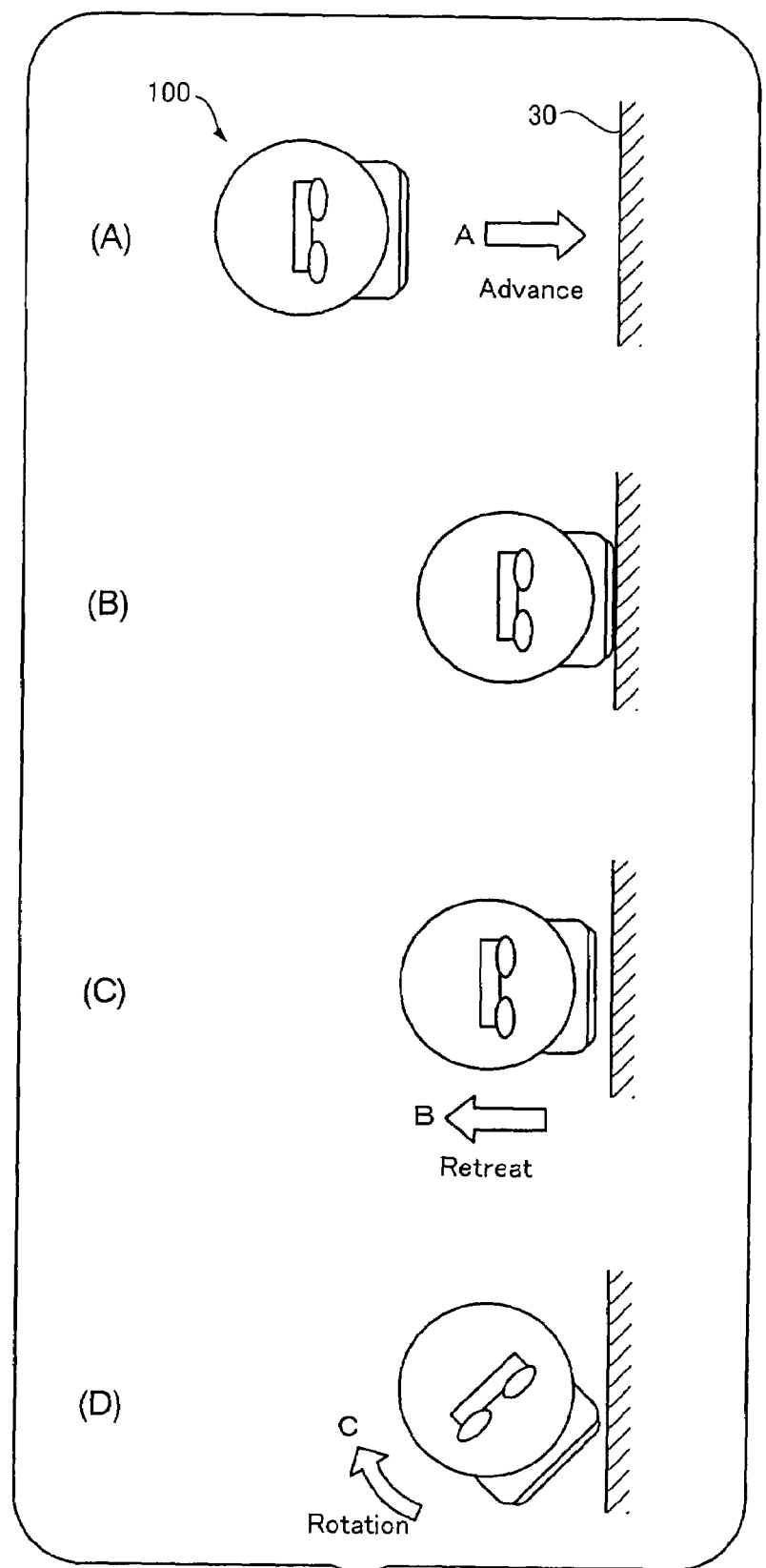
FIG. 6 is a typical view showing how the robot collides with an obstacle such as a high difference in level.

FIG. 6 is a typical view showing how the robot collides with an obstacle such as a high difference in level. The action of the distance sensor 117 shown in FIGS. 1 and 2 is omitted here.

The robot 100 advances toward the obstacle 30 in the direction of the arrow A (see step a1 in FIG. 5), as shown in part (A) of FIG. 6, and collides with the obstacle 30 (see step a7 in FIG. 5), as shown in part (B) of FIG. 6. At this time, it is supposed that not only the lower bumper 119 but also the upper bumper 118 shown in FIGS. 1 and 2 come into contact with the obstacle 30 (see step a8 in FIG. 5). Then, this robot 100 retreats in the direction of the arrow B to the position where it can turn without being hampered by the obstacle 30 (see step a6 in FIG. 5), as shown in part (C) of FIG. 6.

Thereafter, this robot 100 turns by rotating in the direction of the arrow C and advances again, as shown in part (D) of FIG. 6.

In this way, when the robot collides with the obstacle 30 that it can not get over, the robot does not rotate directly at the same place, but once retreats to the position where it is not impaired by the obstacle, and then rotates. Thereby, even if the robot is angulate in shape, it can securely turn without being impaired by the obstacle, avoiding a situation where it can not move on the spot.

Figure 7:
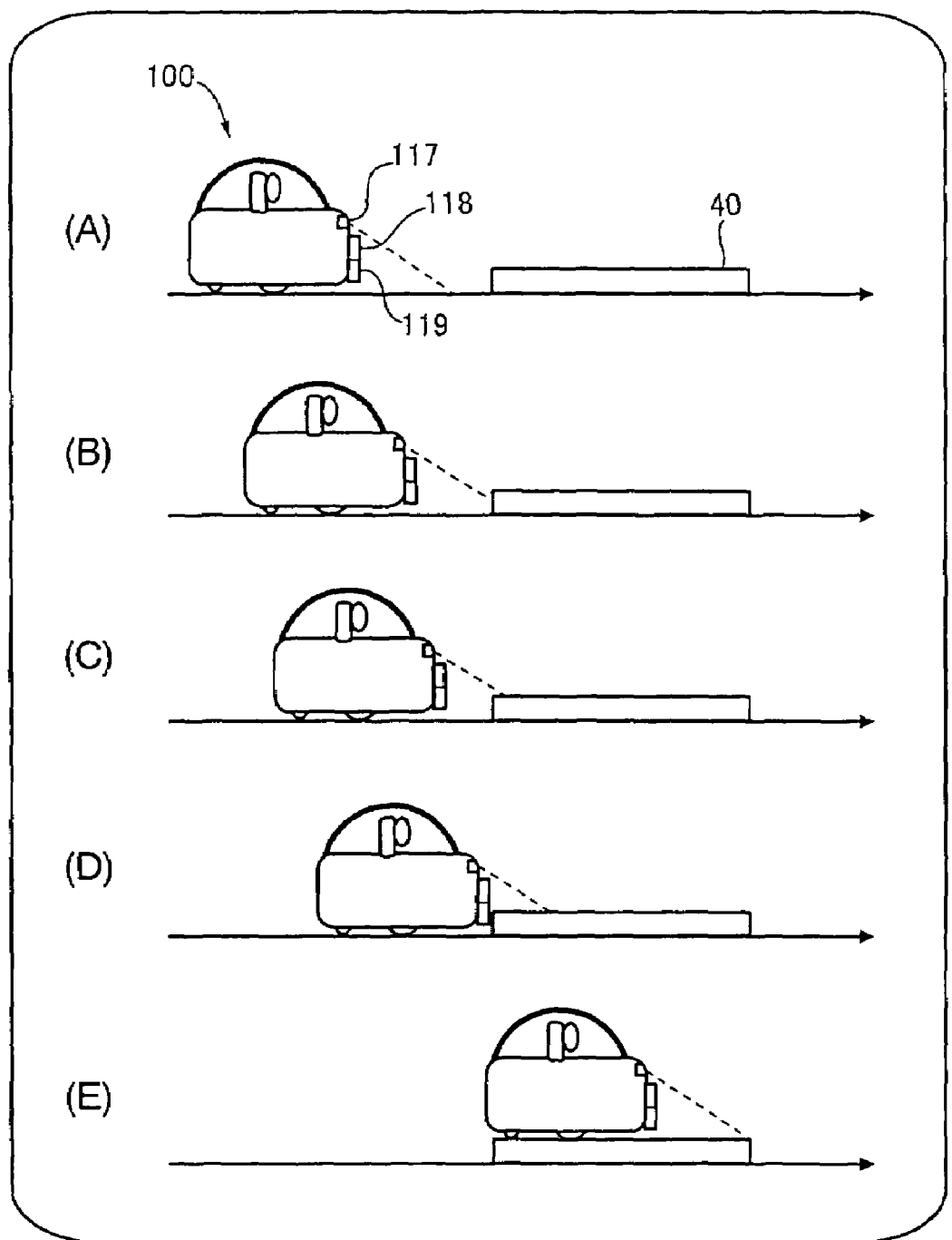
FIG. 7 is a view showing the operation of the robot when confronting a low difference in level.

FIG. 7 is a view showing the operation of the robot when confronting a low difference in level.

The robot 100 advances while measuring the distance up to a reflection point of light beam located forward obliquely downward, employing the distance sensor 117 (see step a1 in FIG. 5), as shown in part (A) of FIG. 7. Then, if the distance sensor 117 measures the distance of a predetermined threshold or less (height of a predetermined threshold or more) because the reflection point of light beam approaches a difference in level 40 (see step a2 in FIG. 5), the robot continues to advance at the slower speed, as shown in part (B) of FIG. 7. While the robot is advancing at the slower speed, the measured distance is not changed from the state of part (C) of FIG. 7 to the state of part (D) of FIG. 7 (see step a6 in FIG. 5), but the robot further advances, resulting in the state where the bumper bumps into the difference in level 40 (see step a7 in FIG. 5), as shown in part (D) of FIG. 7. Herein, it is supposed that the upper bumper 118 does not bump into the difference in level 40, but only the lower bumper 119 bumps into it (step a8 in FIG. 5). In this case, it is determined that the robot can climb this difference in level 40. Thereby, the robot performs an operation of climbing the difference in level as will be described with reference to FIG. 8, and advances from the state where the bumper 119 bumps into the difference in level as shown in part (D) of FIG. 7 to the state where the robot climbs the difference in level as shown in part (E) of FIG. 7. Thereafter, the robot continues to further advance.

Figure 8:
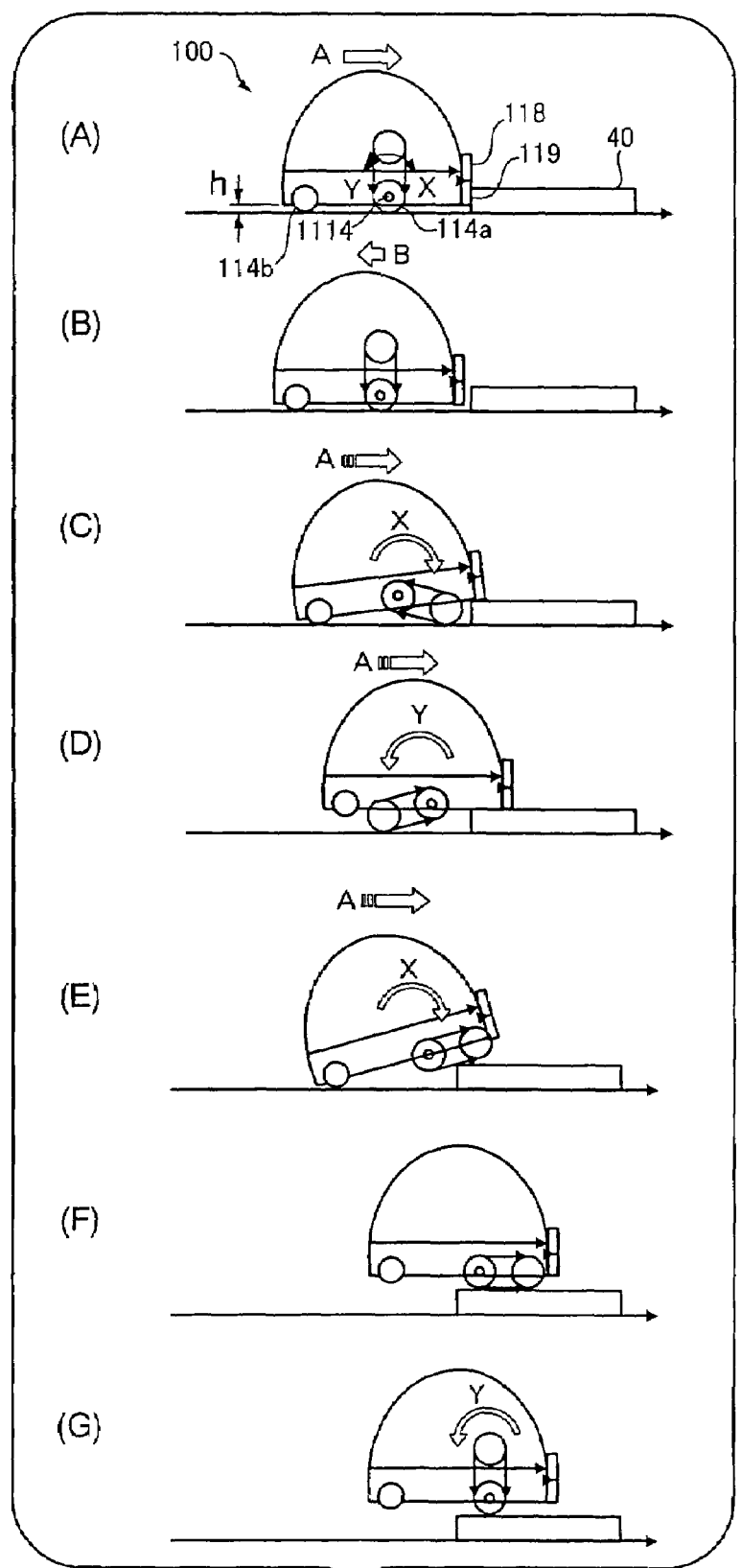
FIG. 8 is a view showing the operation when the robot climbs the difference in level.

FIG. 8 is a view showing the operation when the robot climbs the difference in level.

As previously described, the driving section 114 (see FIG. 4) of this robot 100 is equipped with the front wheel 114a and the rear wheel 114b. Herein, the front wheel 114a is a crawler mounted wheel including the upper and lower two wheels and an endless belt connecting them, for example, as shown in part (A) of FIG. 8. An upper wheel can freely rotate in the direction of the arrow X-Y around the rotation axis 1114 of a lower wheel, as shown in part (A) of FIG. 8.

The robot advances in the direction of the arrow A and the bumper 119 bumps into the difference in level 40, as shown in part (A) of FIG. 8.

When the difference in level 40 is less than or equal to the height h as shown in part (A) of FIG. 8, even the lower bumper 119 does not bump into the difference in level, in which this height h is the height that this robot 100 can advance without being aware of the difference in level.

It is determined here that of the upper bumper 118 and the lower bumper 119, only the lower bumper 119 bumps into the difference in level. Thereby, the robot once retreats slightly (e.g., about 5 cm) in the direction of the arrow B, as shown in part (B) of FIG. 8, rotates the crawler in the direction of the arrow X to raise a front portion of the robot, and advances in the direction of the arrow A to allow the front portion of the robot to ride on the difference in level, as shown in part (C) of FIG. 8. Then, the robot reversely rotates the crawler in the direction of the arrow Y to raise a rear portion of the robot, and advances in the direction of the arrow A, as shown in part (D) of FIG. 8. The distance that the robot advances at this time is the extent that the crawler is rotated again in the direction of the arrow X to partly ride on the difference in level, as shown in part (E) of FIG. 8. If the crawler is rotated again in the direction of the arrow X, the crawler rides on a corner portion of the difference in level, whereby the robot advances in this state in the direction of the arrow A, as shown in part (E) of FIG. 8. The amount of advancement at this time is the extent that the robot fully rides with the center-of-gravity position on the difference in level. Thus, the center-of-gravity position of the robot is fully located on the difference in level, even though the rear portion of the robot overhangs from the difference in level, as shown in part (F) of FIG. 8.

Thereafter, the crawler is rotated in the direction of the arrow Y and restored to its initial state, and the robot directly advances, as shown in part (G) of FIG. 8.

Through the above operation, this robot 100 transits from the state where the bumper bumps into the difference in level as shown in part (D) of FIG. 7 to the state where the robot rides on the difference in level as shown in part (E) of FIG. 7.

An operation in which the robot moves to the target position employing the image photographed by the twin-lens camera will be described below.

Figure 9:
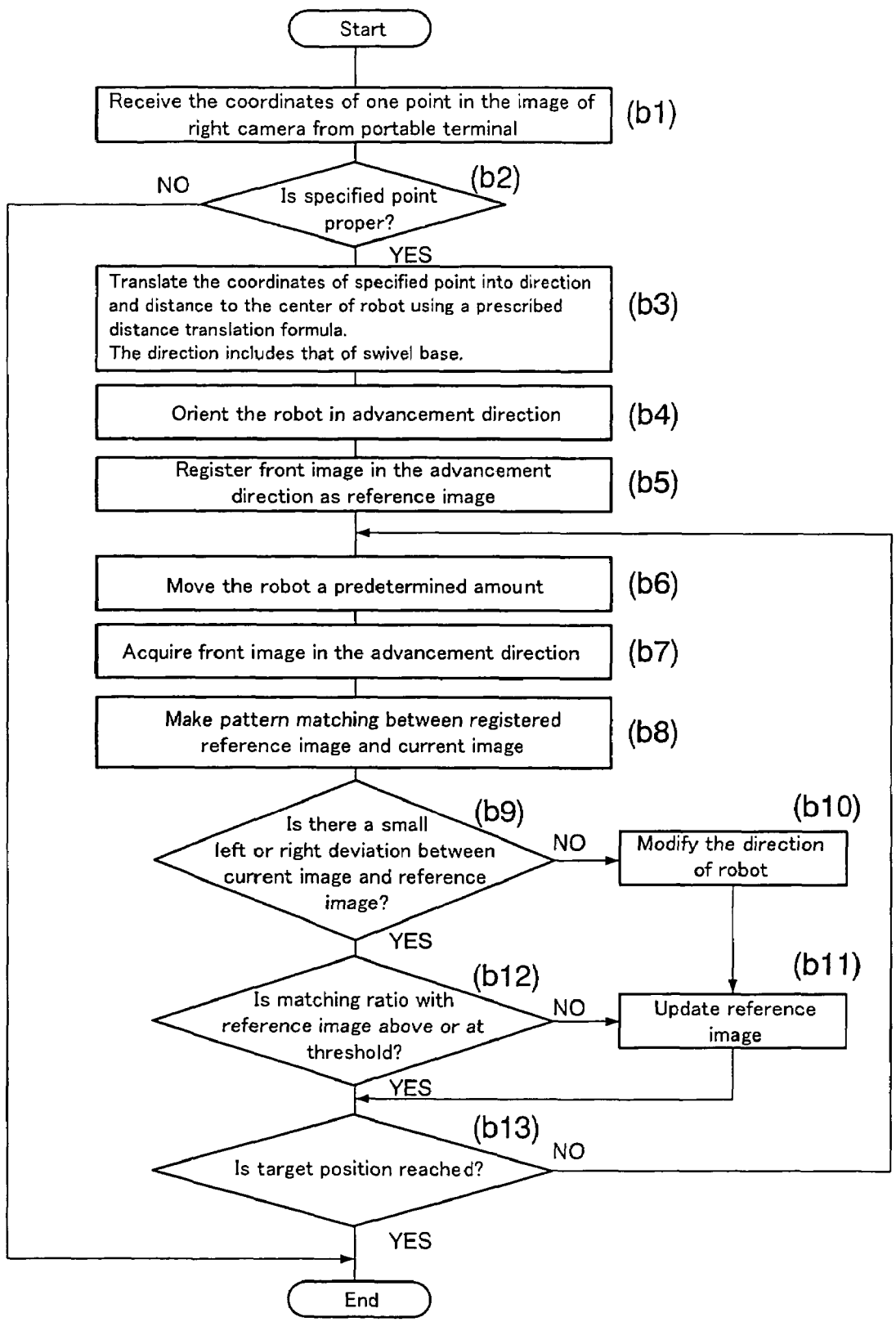
FIG. 9 is a flowchart showing the operation when the robot moves toward a movement target position on the image.

FIG. 9 is a flowchart showing the operation when the robot moves toward a movement target position on the image.

The image photographed by the right camera 116a (see FIG. 2) of the twin-lens camera 116 for the robot 100 as shown in FIG. 4 is passed via the CPU board 111 of FIG. 4 to the communication section 112 and transmitted through the packet radio communication from the communication section 112 via the base station 20 as shown in FIG. 1 to the portable telephone 10. In the portable telephone 10, the user places the cursor 12 at the movement target position to move the robot on the image, as shown in FIG. 3, and sends out the coordinate information of the cursor. This coordinate information of the cursor is received via the base station 20 by the communication section 112 (see FIG. 4) of the robot 100, and passed to the CPU board 111 (step b1 in FIG. 9).

Then, it is determined whether or not the spot specified by the coordinate information is not the wall face but the proper spot as the movement target position (step b2). If the spot is determined to be proper, the specified coordinate point is translated into the direction and distance to the center of the robot in accordance with a prescribed distance translation formula, employing the parallax between the right camera 116a and the left camera 116b (see FIG. 2) of the twin-lens camera 116, and referring to the orientation of the camera (the twin-lens camera 116 can change its orientation freely by means of the swivel base 115 as previously described) when taking the image used to indicate its specified point (step b3).

Thereafter, the robot is oriented to the acquired advancement direction (step b4), the front image in the advancement direction is registered as the reference image (step b5), the robot moves (advances) a predetermined amount (step b6), the front image in the advancement direction is newly taken (step b7), and a pattern matching between the registered reference image and the currently taken image is made (step b8). In the pattern matching of this embodiment, the longitudinal line of the image is extracted, and pattern matching between the reference image and the current image is made for the longitudinal line.

As a result of the pattern matching, it is determined whether or not there is a small left or right deviation between the current image and the reference image (step b9). If the left or right deviation is more than or equal to a predetermined amount of deviation, the advancement direction of the robot is modified (step 10), and the front image after the advancement direction is modified is newly registered as the reference image (step b11).

Also, if it is determined that there is a small left or right deviation between the current image and the reference image at step b9, the procedure goes to step b12 to determine whether or not the matching ratio of pattern matching between the current image and the reference image is more than or equal to a threshold value. If the matching ratio is lower, the current image is updated as the new reference image (step b11).

Thereafter, it is determined whether or not the robot reaches the target position (step b13). If the robot has not yet reached target position, the sequence following step b6 is repeated.

Though the operation sequence of FIG. 9 takes place when there is no obstacle possibly hampering the advancement of the robot in the advancement direction of the robot, the operation sequence when there is any obstacle ahead in the advancement direction will be described below.

Figure 10:
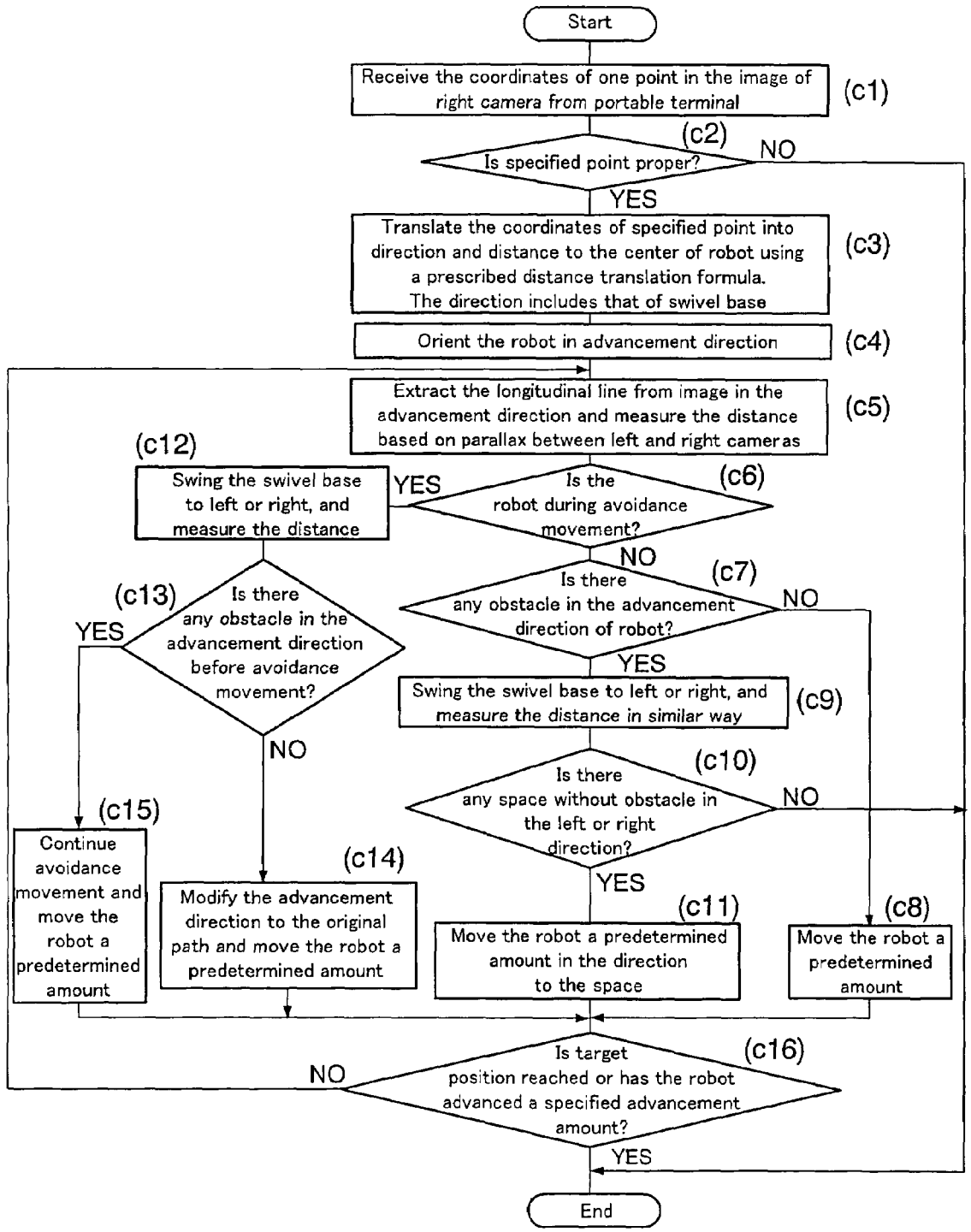
FIG. 10 is a flowchart showing an operation sequence of the robot when there is an obstacle in the advancement direction.

FIG. 10 is a flowchart showing the operation sequence of the robot when there is an obstacle in the advancement direction.

Figure 11:
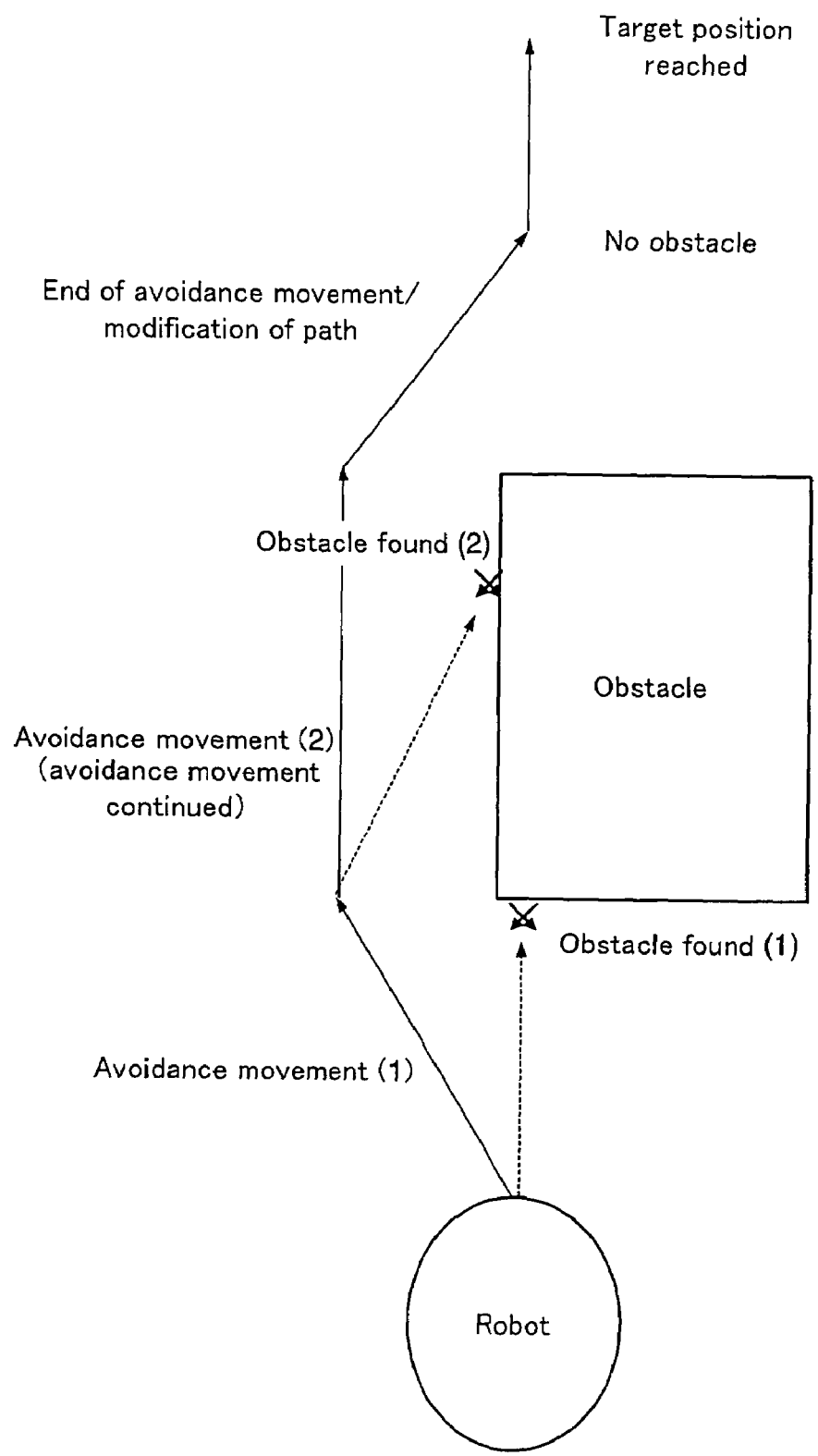
FIG. 11 is a view showing a movement locus of the robot moving in accordance with the operation sequence of FIG. 10.

FIG. 11 is a view showing a movement locus of the robot moving in accordance with the operation sequence of FIG. 10.

The steps c1 to c4 of FIG. 10 are identical to the steps b1 to b4 of FIG. 9, and not described again here.

After the robot is oriented in the advancement direction at step c4, the longitudinal line is extracted from the image in the advancement direction, and the front distance in the advancement direction is measured from the parallax of the left and right cameras (step c5). At present, when the robot is advancing toward the movement target position but not during the avoidance movement to avoid the obstacle (step c6), it is determined whether or not there is any obstacle in the advancement direction of the robot from the distance measured at step c5 (step c7). If there is no obstacle, the robot moves (advances) a predetermined amount (step c8). Then, it is determined whether the robot has reached the target position or advanced a specified amount of advancement, or the robot has not yet reached the target position or not yet advanced the specified amount of advancement (step c16). Herein, the specified amount of advancement means the equivalent distance up to the movement target position in the direction to the movement target position specified on the image as seen from the robot before the robot starts to move. To advance the specified amount of advancement without reaching the target position means that the robot has not yet reached the target position due to the existence of any obstacle, but advances in the direction to the target position by avoiding the obstacle, whereby the robot advances the same distance (e.g., near the target position) as reaching the target position if there is no obstacle.

When the robot has not yet reached the target position and not yet advanced the specified amount of advancement, the procedure returns to step c5, where the front distance measurement is newly made.

If it is determined that there is any obstacle in the advancement direction of the robot at step c7 (corresponding to "obstacle found (1)" in FIG. 10), the procedure goes to step c9 to measure the distance ahead in the line of sight of the camera by swinging the swivel base to the left and right in the same way as at step c5 (step c9). Then, it is determined whether or not there is any space without obstacle in the left or right direction (step c10). If there are obstacles in both the left and right directions, as well as in the front, the robot is stopped on the spot.

On the other hand, if there is any space without obstacle in the left or right direction at step c10, the robot moves a predetermined amount in the direction to the space (step c11). This step c11 corresponds to "avoidance movement (1)" in FIG. 11. After the robot moves the predetermined amount in the direction to the space at step c11, the procedure goes to step c16 to determine whether or not the robot has advanced up to the stop position. If the robot has not yet advanced up to the stop position, the procedure returns to step c5.

After the distance is measured from the image in the advancement direction at step c5, if the robot performs the avoidance movement at present (step c6), the procedure goes to step c12 to measure the distance to the position obliquely forward by swinging the swivel base to the left and right in the same way. Then, it is determined whether or not there is any obstacle in the advancement direction before the robot makes the avoidance movement (step c13). If there is any obstacle in the advancement direction (corresponding to "obstacle found (2)" in FIG. 11), the robot moves the predetermined amount while continuing the avoidance movement (step c15; corresponding to "avoidance movement (2)" in FIG. 11). On the other hand, if there is no obstacle in the advancement direction before the robot makes the avoidance movement, the robot modifies the advancement direction to return to the original path, and moves the predetermined amount (step c14; corresponding to "end of avoidance movement/modification of path" in FIG. 11).

By repeating the above procedure, the robot advances up to the stop position (step c16).

Though in this embodiment, the operation sequence of the robot has been described for every scene, the robot of this embodiment may perform a combination of those operation sequences. In the present invention, it is not essential to combine all the operations.

The invention claimed:

1. A robot capable of freely advancing, retreating and rotating, comprising:

a sensor that senses whether or not a front obstacle is an obstacle having a predetermined height or less that the robot can get over, or an obstacle having more than the predetermined height that the robot can not get over; and a motion control section that controls the robot to continuously advance to get over the obstacle if the height of the obstacle sensed by the sensor is the predetermined height or less during the advancement, or to perform an obstacle avoidance movement including at least one of the retreat and rotation, if the height of the obstacle sensed by the sensor is more than the predetermined height.

2. The robot according to claim 1, wherein the sensor is composed of a first sensor sensing the contact with the obstacle having the predetermined height or less during the advancement, and a second sensor sensing the contact with the obstacle having more than the predetermined height, in which the obstacle is determined to have the predetermined height or less if the obstacle is sensed by only the first contact sensor of the first and second contact sensors, or the obstacle is determined to have more than the predetermined height if the obstacle is sensed by the second sensor.

3. The robot according to claim 2, further comprising a distance sensor measuring a distance up to a measuring point that is forward obliquely below, in addition to the first and second contact sensors, wherein the motion control section decreases an advancing speed when the distance sensor senses a predetermined distance or less during the advancement.

4. A robot capable of freely advancing, retreating and rotating, comprising:

a sensor that senses whether or not a front obstacle is an obstacle having a predetermined height or less that the robot can get over, or an obstacle having more than the predetermined height that the robot can not get over;

a motion control section that controls the robot to continuously advance to get over the obstacle if the height of the obstacle sensed by the sensor is the predetermined height or less during the advancement, or to perform an obstacle avoidance movement including at least one of the retreat and rotation, if the height of the obstacle sensed by the sensor is more than the predetermined height; and a communication section that receives control data from a base station by wireless, the control data being transmitted from a communication terminal making a radio communication with the base station to the base station, wherein the motion control section is operated based on the control data received by the communication section, and performs the obstacle avoidance movement without waiting for the control data to be received by the communication section.

5. A robot capable of freely moving, comprising:

a camera;

a movement target position information acquisition section that acquires movement target position information specified on an image photographed by the camera;

a motion control section that moves the robot up to a movement target position specified by the movement target position information acquired by the movement target position information acquisition section; and a communication section that transmits an image taken by the camera to a base station by wireless, and via the base station to a communication terminal making a radio communication with the base station, and receives by wireless the movement target position information specified on the image by an operation of the communication terminal via the base station, in which the movement target position acquisition section includes the communication section.

6. A robot capable of freely moving, comprising:
a camera;
a movement target position information acquisition section that acquires movement target position information specified on an image photographed by the camera; and
a motion control section that moves the robot up to a movement target position specified by the movement target position information acquired by the movement target position information acquisition section,
wherein the camera is composed of a pair of left and right cameras installed a predetermined distance away from each other to have a parallax; and
a distance measurement section that measures a distance up to the movement target position specified by the movement target position information acquired by the movement target position information acquisition section, employing the parallax of the pair of left and right cameras,
wherein the motion control section recognizes a movement distance based on the distance measured by the distance measurement section when the robot moves up to the movement target position.

7. The robot according to claim 6, wherein the distance measurement section measures a distance up to the movement target position and a distance up to the obstacle, employing the parallax between the pair of left and right cameras, and wherein the motion control section performs an obstacle avoidance movement including the operation of changing the movement direction by acquiring information about the distance up to the obstacle measured by the distance measurement section.

8. A robot capable of freely moving, comprising:
a camera;
a movement target position information acquisition section that acquires movement target position information specified on an image photographed by the camera;
a motion control section that moves the robot up to a movement target position specified by the movement target position information acquired by the movement target position information acquisition section;
a visual line movement section that moves a visual line of the camera to the left or right; and
a direction calculation section that calculates a direction to the movement target position in consideration of an orientation of the camera when taking the image on which the movement target information acquired by the movement target position acquisition section is based,
wherein the motion control section recognizes a movement direction based on the direction calculated by the direction calculation section when the robot moves up to the movement target position.

9. A robot capable of freely moving, comprising:
a camera;
a movement target position information acquisition section that acquires movement target position information specified on an image photographed by the camera;
a motion control section that moves the robot up to a movement target position specified by the movement target position information acquired by the movement target position information acquisition section; and
an image storage section that stores rewritably a reference image ahead in the advancement direction, which is photographed by the camera,
wherein the motion control section controls the robot to advance by repeating a pattern matching between the current image photographed by the camera and the reference image stored in the image storage section to modify the advancement direction.

10. A robot capable of advancing, retreating and rotating, comprising:
a sensor that senses the existence of an obstacle hampering an advancement of the robot;
a motion control section that performs an obstacle avoidance movement in which the robot retreats to a position where the robot is rotatable by avoiding the obstacle when the sensor senses the existence of the obstacle during the advancement of the robot; and
a communication section that receives control data from a base station by wireless, the control data being transmitted from a communication terminal to the base station,
wherein the motion control section is operated based on the control data received by the communication section, and performs the obstacle avoidance movement without waiting for the control data to be received by the communication section.

* * * * *